United States Patent [19]
Doyon

[11] Patent Number: 5,400,734
[45] Date of Patent: Mar. 28, 1995

[54] AUTOMOTIVE AMPHIBIOUS VEHICLE

[76] Inventor: Paul Doyon, 2283, Ave. Dollard, #4, Shawingigan, Québec, Canada, G9N 2G3

[21] Appl. No.: 58,763

[22] Filed: May 10, 1993

[51] Int. Cl.⁶ .............................................. B63B 35/00
[52] U.S. Cl. .................................................... 114/270
[58] Field of Search ................ 180/9.21, 9.26, 9.28, 180/9.3, 9.32, 9.46; 114/270; 305/35 R, 34 EB, 54, 15; 440/95–97

[56] References Cited

U.S. PATENT DOCUMENTS

| | | | |
|---|---|---|---|
| 1,298,367 | 3/1919 | Macfie | 180/9.32 |
| 1,788,440 | 1/1931 | Drell | 114/270 |
| 2,220,890 | 11/1940 | Cook | 180/9.1 |
| 2,413,850 | 1/1947 | Swennes | 114/270 |
| 2,453,149 | 11/1948 | McCutchen | 114/270 |
| 2,536,543 | 1/1951 | Focht | 180/9.1 |
| 2,856,014 | 10/1958 | Garnier | 180/9.3 |
| 3,435,908 | 4/1969 | Sunderlin et al. | 180/9.44 |
| 3,473,619 | 10/1969 | Dion | 180/9.44 |
| 3,487,802 | 1/1970 | Roy | 114/270 |
| 3,558,198 | 1/1971 | Tomita | 305/54 |
| 3,782,787 | 1/1974 | Rubel et al. | 305/54 |
| 4,072,203 | 2/1978 | Pierson | 180/9.44 |
| 4,194,583 | 3/1980 | Aaen | 305/35 EB |
| 4,645,023 | 2/1987 | Pierson | 180/9.52 |

FOREIGN PATENT DOCUMENTS

399906 10/1941 Canada .
960728 1/1975 Canada .

*Primary Examiner*—Edwin L. Swinehart
*Attorney, Agent, or Firm*—Pierre Lespérance; Francois Martineau

[57] ABSTRACT

A vehicle capable of going on public roads, on dirt roads, as well as over water. The vehicle includes two aft tracks and one front track, each track being powered by a hydraulic motor. The wheels are removably mounted to the tracks, and the wheel axles are operatively coupled to the corresponding hydraulic motors of the tracks. The tracks have a trapezoidal shape, which promotes the difficult transfer displacement of the vehicle from water to land, at the river bank edge. The tracks enclose buoyant material. Over water, the vehicle is powered by an outboard motor.

8 Claims, 8 Drawing Sheets

AUTOMOTIVE AMPHIBIOUS VEHICLE

FIELD OF THE INVENTION

This invention relates to amphibious vehicles capable of automotive motion on either public roads, dirt roads or water.

BACKGROUND OF THE INVENTION

Amphibious vehicles need not only to move easily on ground as well as on water, they also need to be able to egress with relative ease from water to ground. Egress from water is always a difficult operation, due to the slope, softness, variable ground-truth properties and slippery nature of the terrain at the water/land edge.

One problem of known amphibious vehicles is their relative large weight, which is often incapacitating at the water/land edge, since the soil rapidly becomes of quick-sand like properties for the vehicle; and the vehicle sinks into ground. It is recognized that hovercraft-type vehicles that hover above ground and water through generation of a levitation inducing cushion of downwardly directed pressurized gas, solve the above-noted problems; however, such vehicles are expensive both in initial, fixed costs as well as in day-to-day operating costs.

OBJECTS OF THE INVENTION

It is therefore the gist of the present invention to address the need for an inexpensive automotive amphibious vehicle, being particularly adapted for easy egress from water to land at and move over same.

An object of the invention is to provide such an amphibious vehicle, being of lightweight construction so as to facilitate egress from water over river bank land.

Another object of the invention is to provide such an amphibious vehicle, with means for engaging even steep slopes of river banks, and still be able to egress from water over land.

SUMMARY OF THE INVENTION

In accordance with the objects of the invention, there is disclosed an amphibious vehicle for automotive motion over public roads, dirt roads and water, said vehicle comprising: (a) a buoyant chassis, defining an underface; (b) a pair of first and second track members, rotatably mounted to the rear of said chassis underface; (c) a third track member, rotatably mounted to the front of said chassis underface; (d) hydraulic power means, one for each said track member, for entraining said track members for forward displacement of said vehicle; wherein said front track member defines a front, upwardly forwardly inclined side run for facilitating negotiation of sloped bank landing, egress from water and vehicle transfer to land.

DETAILED DESCRIPTION OF THE INVENTION

Figure 1:
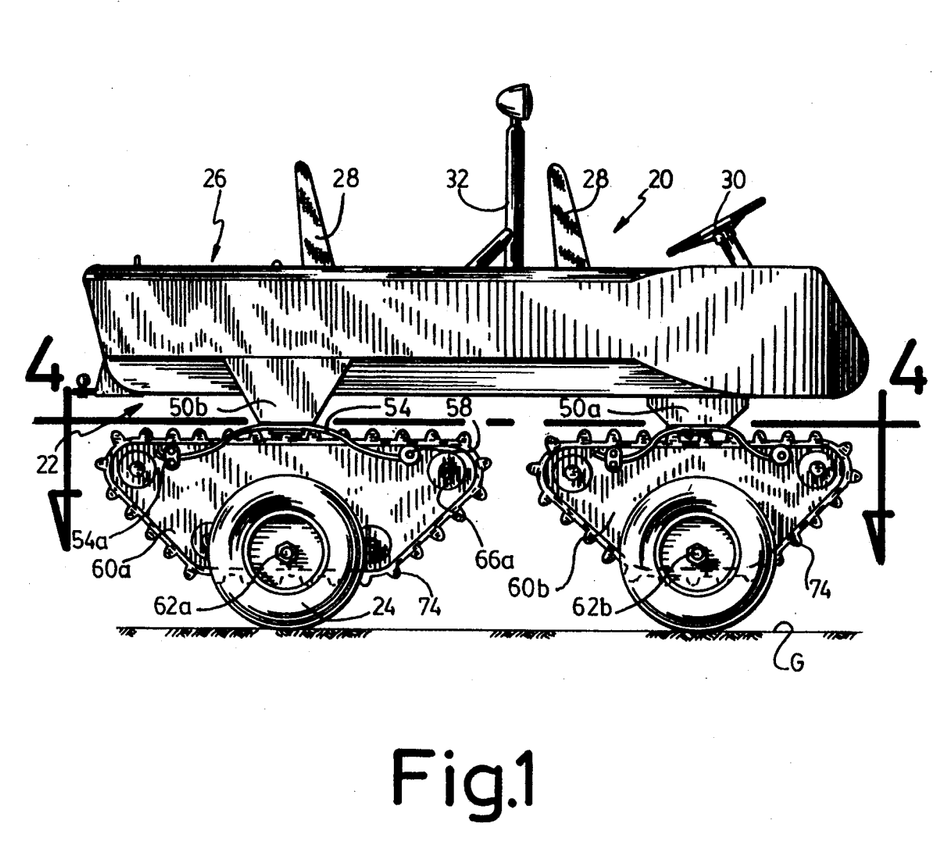
FIGS. 1-2 are side and front end elevations, respectively, of a first embodiment of amphibious vehicle of the invention, being wheel mounted and standing on ground.
Figure 2:
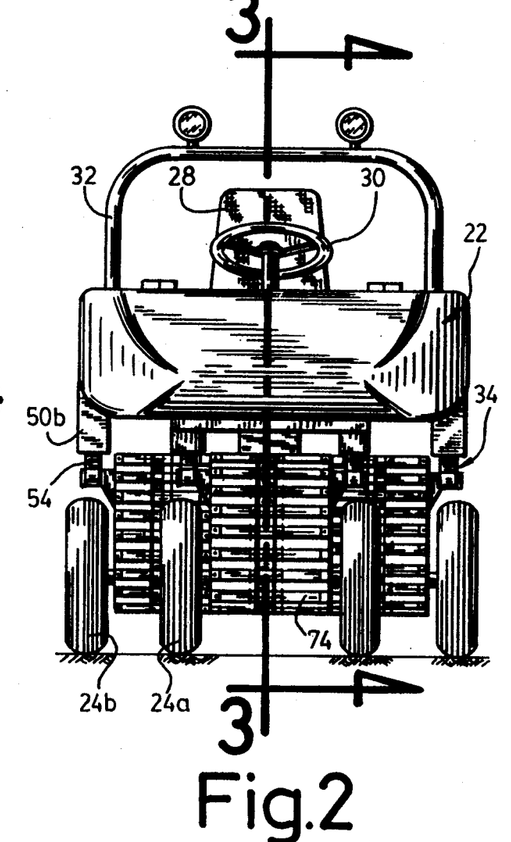
Figure 3:
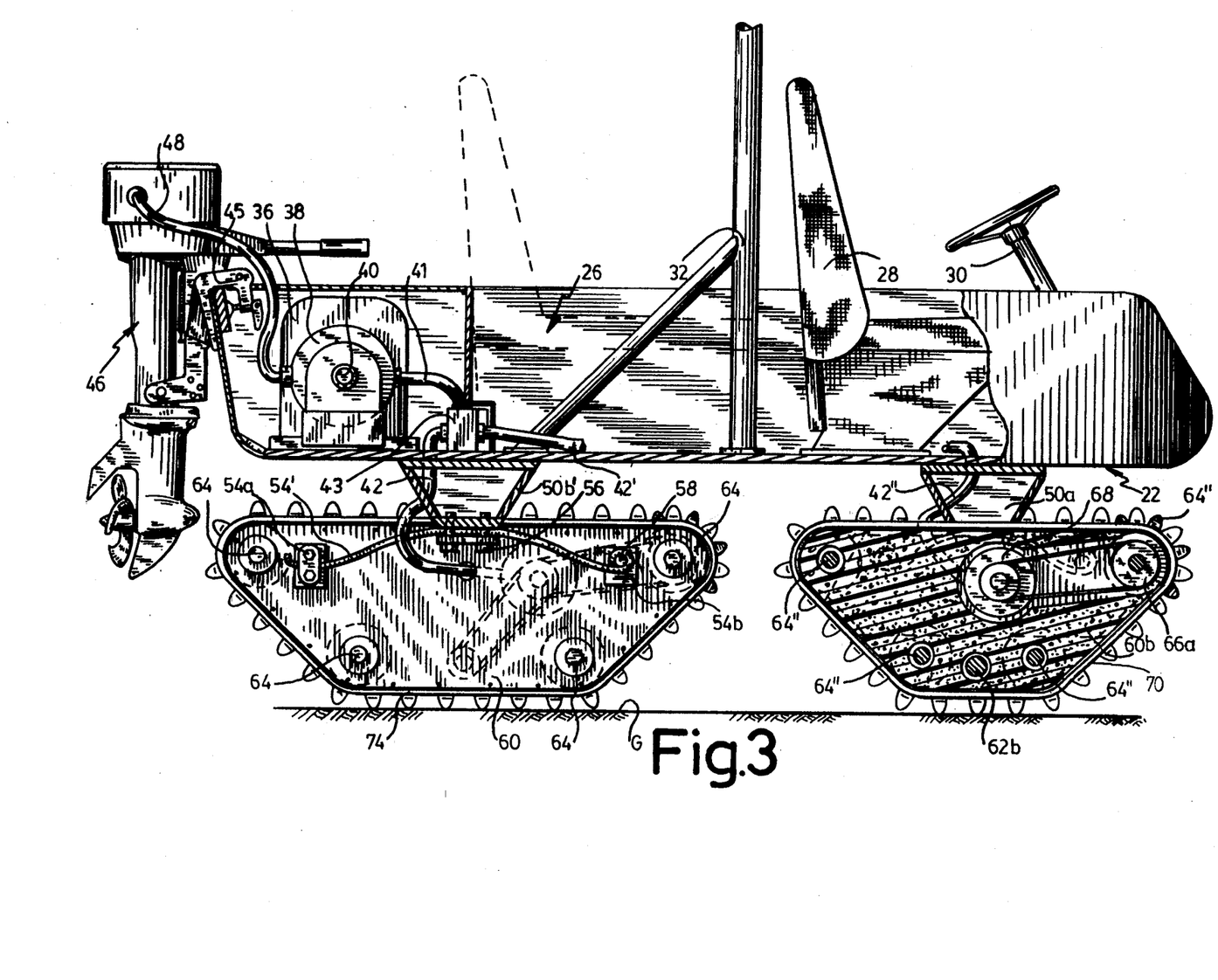
FIG. 3 is a cut away sectional view along line 3—3 of FIG. 2, at an enlarged scale, but the wheels being removed.
Figure 4:
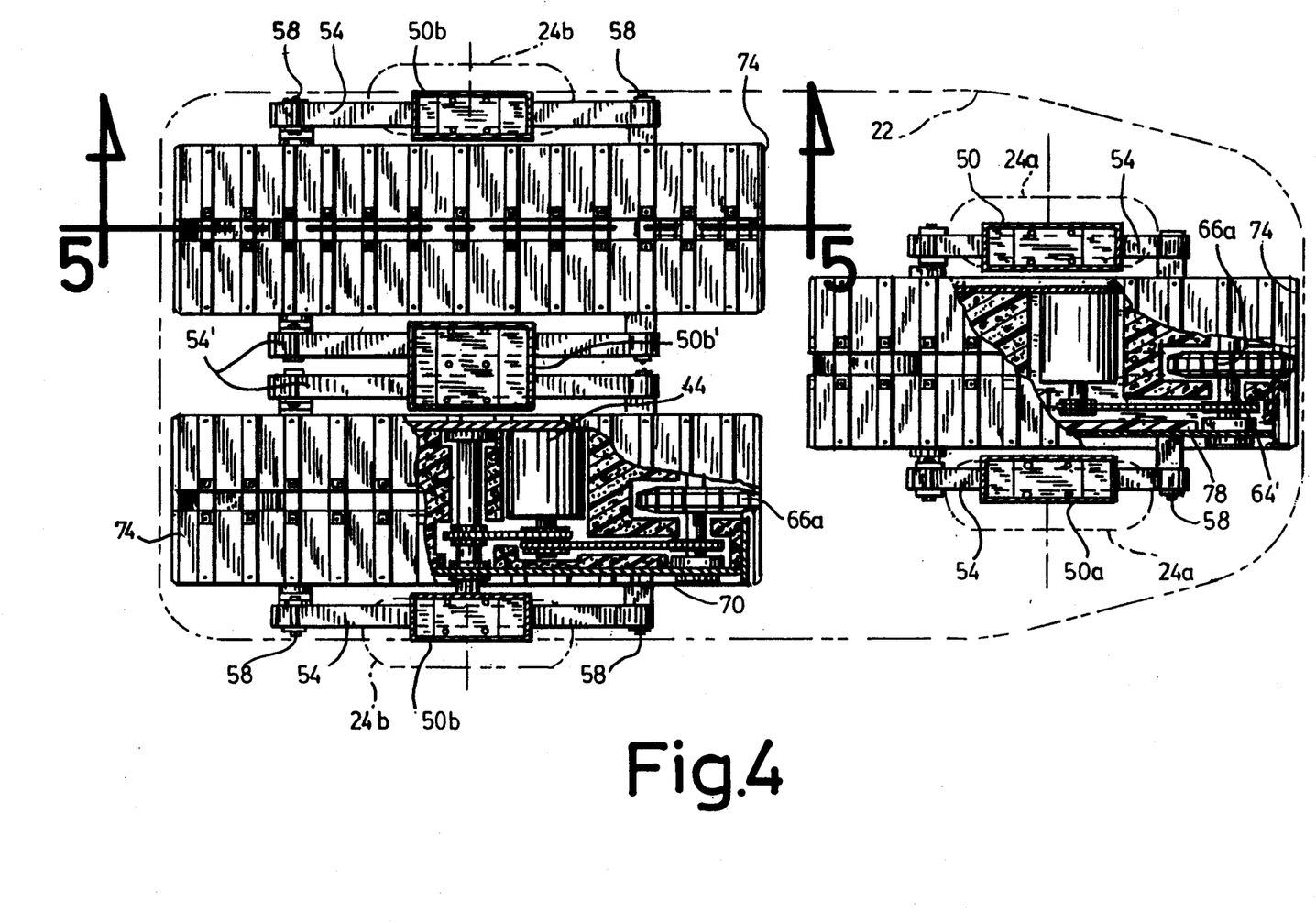
FIG. 4 is a partly cut away view of the present vehicle, taken about perspective 4—4 of FIG. 1, and at an enlarged scale.

Vehicle 20 illustrated in FIGS. 1-3 includes a buoyant chassis 22 carried over ground G by wheels 24. Chassis 22 is made from a buoyant material, such that when partly submerged in water, even with the vehicle 20 being fully loaded, the vehicle relative density will remain smaller than one (i.e. will float). Chassis 22 defines a cockpit 26 supporting seats 28, a drive column 30 at the front end and a structural rigidity enhancing U-bar 32 at an intermediate section thereof. The pair of front wheels 24a are much closer to one another, compared to the rear wheels 24b. Wheels 24 are connected to chassis 22 by mount means 34, detailed below. The aft portion of cockpit 26 supports a gas motor engine 36, coupled to a hydraulic pump 38 by drive shaft 40. Hydraulic pump 38 is then connected by a fluid hose 41 to a multiple outlet coupler unit 43, mounted into cockpit 26, for connection with three fluid hoses 42, 42', 42". Hoses 42 are operatively coupled to corresponding hydraulic power engines 44, one for each track 74. Hydraulic power means 44 are contained and supported by the frame of ground tracks 74 (detailed later) spacedly beneath cockpit 26. The aft end of cockpit 26 supports with clamp 45 a water engageable outboard motor 46 in the conventional fashion. Outboard motor 46 is for use when amphibious vehicle 20 floats on water, and is hydraulically powered since operatively connected to hydraulic pump 38 by hose 48.

According to the invention, mount means 34 for mounting the wheels 24 to the chassis 22 includes a number of front brackets 50a and a number of rear brackets 50b, both brackets depending from the underface of chassis 22. Each bracket 50a, 50b may be of trapezoidal cross-section, as suggested in FIG. 3, with the small horizontal side at the bottom, and the large horizontal side at the top. The intermediate section of a metallic leaf strip 54 is anchored to the underface of each bracket 50a and 50b, by bolts 56. The two aft-located interior, metallic leaf springs 54', 54' are fixedly connected at their intermediate section to a common bracket 50b', depending from a central, rearward portion of the vehicle chassis underface 22. A leaf lamella 54 defines curved inturned portions 54a, 54b, at its opposite ends, for pivotal engagement around studs 58 extending horizontally, and transversely of the lengthwise axis of vehicle 20. Studs 58 integrally depend from the top edge of first large vertical plates 60a, in register with the rear wheels 24b, and of second vertical large plates 60b, in register with the front wheels 24a, whereby vertical plates 60a, 60b are connected to chassis 22 via lamellae 54 and brackets 50a, 50b.

Wheels 24a, 24b are rotatably, releasably mounted to idle shafts 62a, 62b that transversely engage the bottom edge portions of vertical plates 60a, 60b. Thus, it is understood that, as wheels 24a, 24b are rotatably mounted to plates 60a, 60b, they will carry the vehicle over ground with vertical plates 60a, 60b edgewisely clearing ground G. A first pair of transversely successive rear plates 60a, 60a are interconnected by four axles 64, on one side of vehicle 20, and a second pair of transversely successive rear plates 60a', 60a', are interconnected by four other axles 64', on the other side of vehicle 20, while the single pair of transversely spaced vertical front plates 60b, 60b are interconnected by four axles 64". Each vertical plate 60a, 60b forms a generally trapezoidal shape, with the large side up. Axles 64, 64', 64" are mounted to the corners of their respective vertical plates 60a, 60b. A sprocket 66 is journalled to each axle 64, 64', 64" for rotation therewith.

Figure 5:
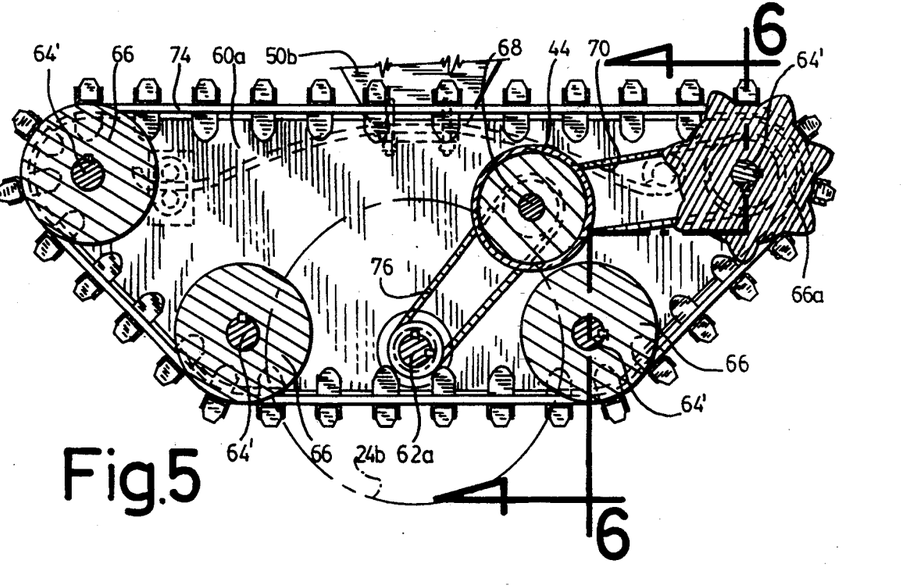
FIG. 5 is a cross-section about broken line 5—5 of FIG. 4.
Figures 6, 7:
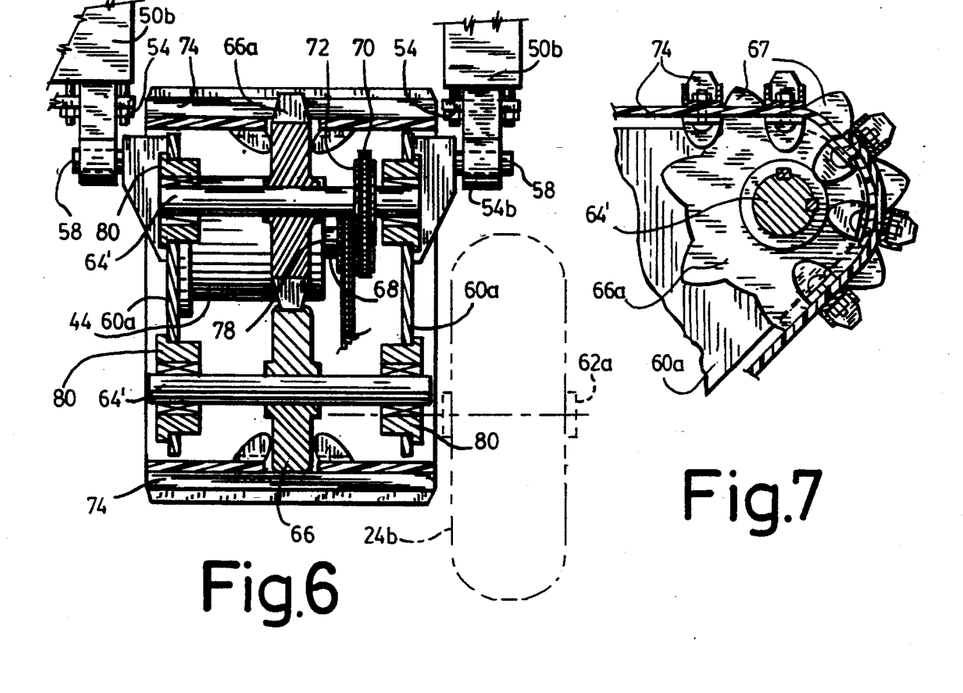
FIG. 6 is an enlarged cross-section about broken line 6—6 of FIG. 5.
FIG. 7 is an enlarged view of one sprocket end portion of the amphibious vehicle tracks.

Each quadruplet of axles 64, 64' 64" includes a drive axle 64a, 64'a, 64"·a being chain-coupled to the drive shaft 68 of hydraulic motor 44 by chain 70 and gears 72 (see FIGS. 5-6), wherein rotation of drive shaft 68 will rotate axle 64' and sprocket 66a. All four sprockets 66 of a quadruplet of axles 66 (66', 66") being interconnected by their peripheral teeth 67 with an endless track 74 meshing therewith, rotation of drive sprocket 66a will entrain in rotation idle sprockets 66 through displacement of track 74.

Wheel axles 62a, 62b are also operatively connected to a corresponding said drive shaft 68 (FIGS. 5-6) by chain 76 and gear 78. Thus, rotation of drive shaft 68 also entrains in rotation wheel axle 62a and, if a wheel 24b is axially mounted to wheel axle 62a, the wheel itself is entrained in rotation in the same direction as track 74. The opposite ends of each of axles 62, 64, 68 engage through and are supported by walls 60a, 60b, as the case may be, and are rotatively carried thereabout by ball bearing mounts 80.

It is thus understood that vehicle 20, shown in FIGS. 1-7, has two alternate power displacement modes:

(a) a gravel, asphalt, or other hardened and packed road-going mode, shown in FIGS. 1-2, in which the vehicle is carried by wheels 24. Wheels 24 are driven by hydraulic power means 44 forming part of the overall track frame 74 supported by brackets 50 beneath cockpit 26. Leaf springs 54 constitute shock absorbers.

(b) an amphibious configuration mode, illustrated in FIG. 3. In this amphibious mode, the vehicle 20 may engage over a body of water, with the wheels 24 being previously removed and the water line extending at an intermediate height level of buoyant chassis 22, whereby cockpit 26 is out of the water. Thus, in deep water, track assemblies 60, 74 are totally submerged. The buoyancy ratio of the material constituting vehicle chassis 22 obviously will be determined as a function of the overall water displacement of the vehicle. Outboard motor 46 will be used for power displacement of the vehicle over water. The vehicle 20 in amphibious mode is furthermore particularly well suited for the difficult vehicle transfer phase from water to land, i.e. at the level of the river bank. Indeed, the trapezoidal shape of the track configuration 60, will facilitate progressive egress from water slopewisely of the river banks. This is due to the upward forward inclination of the front side of each trapezoidal track 74, as clearly seen in FIG. 3, which will follow the slope of the river bank. By powering hydraulic power means 44, the upper leading portion of the forwardly upwardly inclined front face of the front track assembly 74, will engage ground, to move vehicle 20 forward , and lift the front end thereof along this track inclined front face, outwardly from the water. As the two aft-located track assemblies 74 reach ground level, the front track is already upwardly offset relative to the aft track. Again, as with the front track, the upper (leading edge) portion of the forwardly upwardly inclined front face of both rear track assemblies 74, 74 engage ground, to move vehicle 20 forward, and to lift the aft end thereof along these aft tracks inclined front faces, outwardly from the water. Outboard motor 46 has by then been disengaged. Tracks 74 thereafter enable displacement of vehicle 20 over a variety of terrains, including uneven, unpacked, rough terrain.

Power output to each track 74 is optimised, since each of the three tracks 74 is powered by a distinct hydraulic power means 44 located within the area circumscribed by the corresponding track 74.

Drive column 30 is operatively coupled to the front track assembly 60, 74 for controlling the direction of displacement of vehicle 20 over ground, in either the ground-engaging track mode (FIG. 3) or in the wheel engaging mode (FIGS. 1-2). Drive column 30 is preferably power assisted in the known fashion, to reduce the manual effort required for maneuver. Over the water, directional control depends from maneuver of the handle lever 47 of outboard motor 46, as is readily understood.

Figure 8:
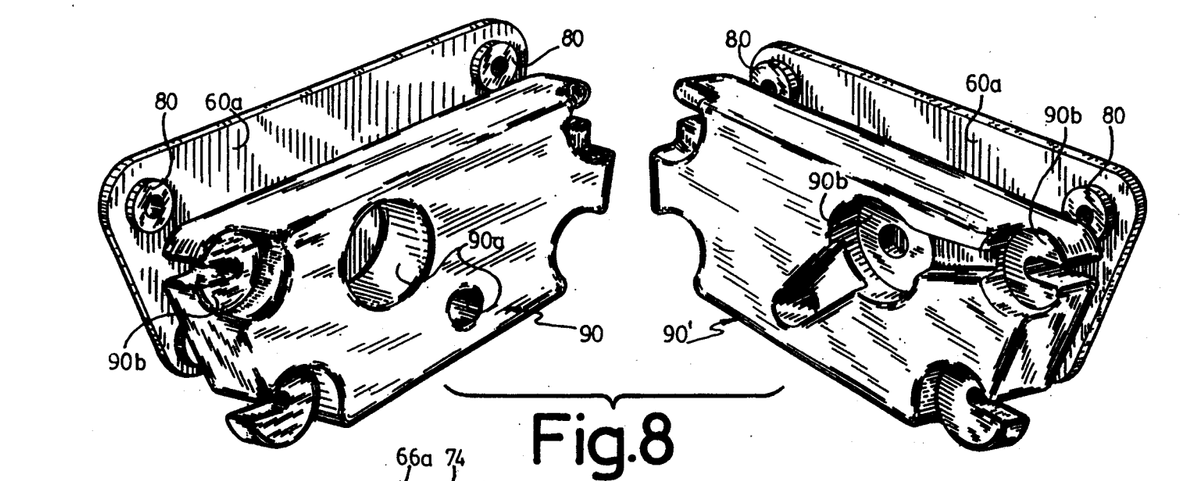
FIG. 8 is an enlarged exploded view of the buoyancy member enclosing frame of a track assembly from the amphibious vehicle of the invention.
Figure 9:
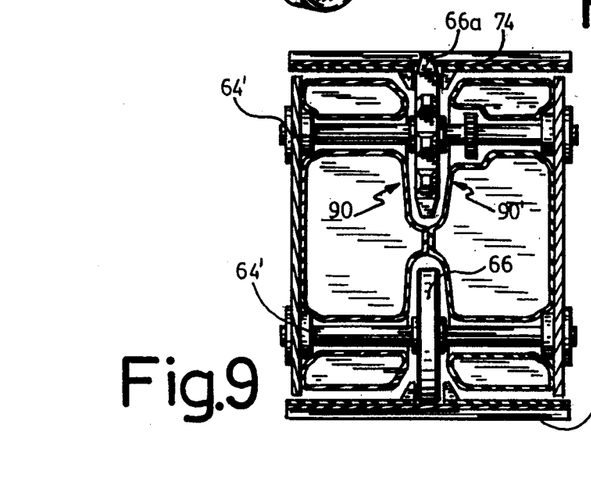
FIG. 9 is a cross-section of a fully assembled track from the amphibious vehicle, showing the buoyancy enhancing members.

Preferably, track assemblies 60, 74 enclose a pair of buoyancy members 90, 90', as illustrated in FIGS. 8-9. Buoyancy members 90 include inner voids 90a or cavities 90b, to clear sprockets 66, 72, 78, shafts 62, 64, 68, chains 72, 76, hydraulic motor housings 44, and the like elements within the area circumscribed by tracks 74. Buoyancy member 90 substantially reduces the required volume of buoyant chassis 22, since the latter need not be as buoyant due to the additional buoyancy provided to vehicle by buoyant member 90.

Figure 10:
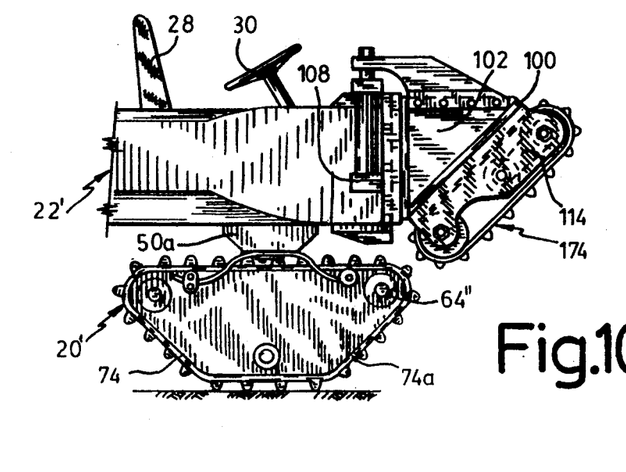
FIG. 10 is a side elevation of the front end of an alternate embodiment of amphibious vehicle, showing the additional inclined track at the upper front of the vehicle.

In the alternate embodiment of FIG. 10, an elongated, ovoidal track member 174 is further provided forwardly of chassis 22', and in axial alignment with the front face 74a of front track 74. Track member 174 is carried in forwardly upwardly inclined fashion by a rail 100, being integral to a cross-sectionally triangular frame extension 102 at the front end of chassis 22'. Track member 174 is slidingly movable along rail 100, wherein its lower track run remains coplanar to the front, forwardly upwardly inclined face 74a of track 74. A yoke member 114 rotatably interconnects track 174 to rail 100.

It is understood that inclined track 174 improves the bank-engaging capability of vehicle 20', i.e. it enables same to egress from the water even in steep slope bank terrain.

As illustrated in FIGS. 11–14 of the drawings, means 120 are preferably provided to improve stability over water W of partly submerged, amphibious vehicle 20. Stabilizing means 120 are directed toward preventing rolling motion of vehicle 20 over water, and includes extensible flaps 122 carried by each of the lateral sides 26a of the vehicle chassis 26, each in register with a cavity 26b made in the side wall 26a. Each flap 122 includes a main, generally rectangular panel 124, with triangular end walls 126 and a transverse, outer wall 128 on the laterally outward edge of panel 124. Flexible waterproof hinge strips 130, 132 sealingly interconnect walls 26a and 124 and flap sections 124 and 128.

Figures 11, 12, 13, 14:
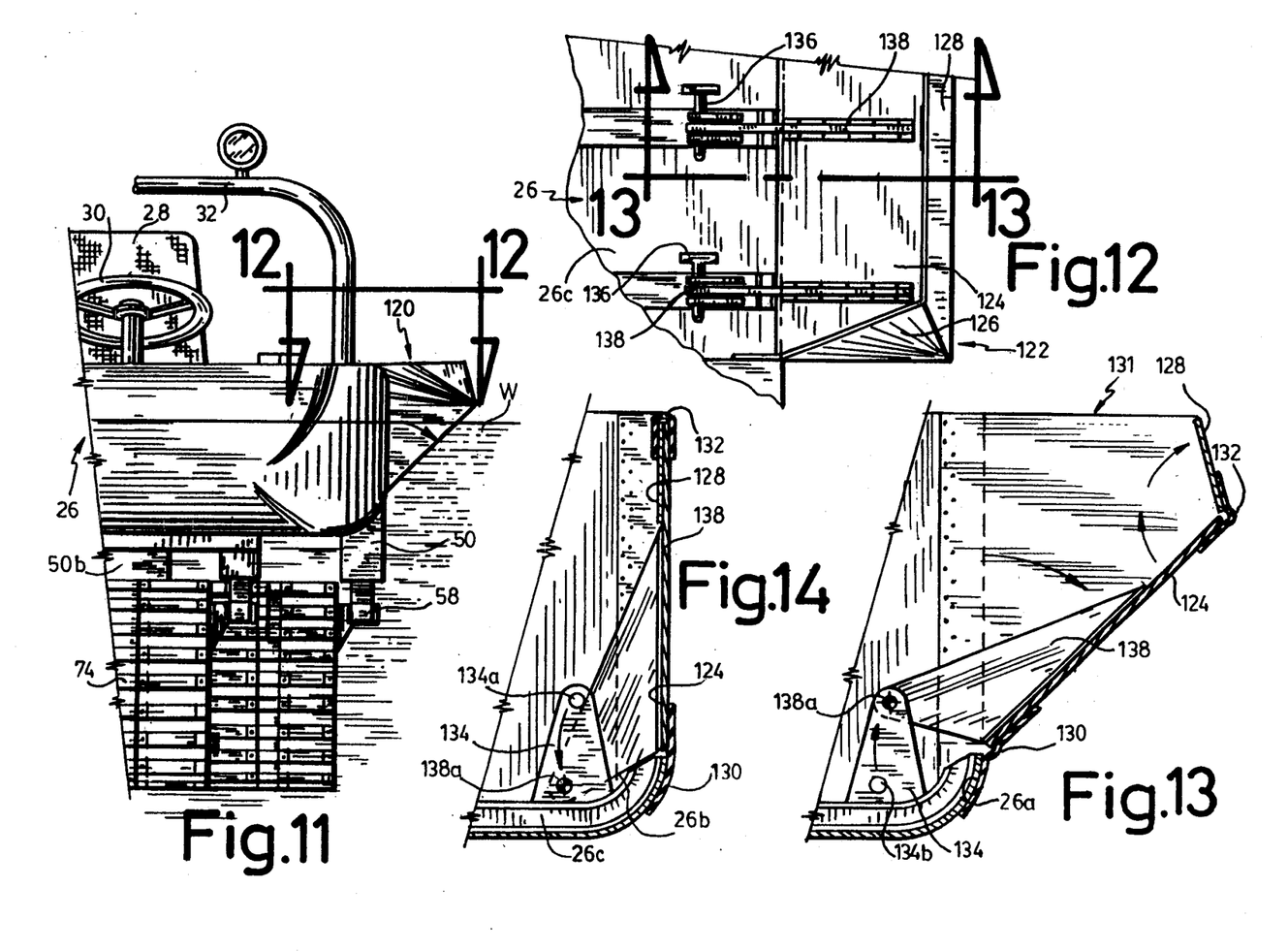
FIG. 11 is a partial, front end elevation of the amphibious vehicle, shown partly submerged into a body of water.
FIG. 12 is an enlarged partial plan view about perspective 12—12 of FIG. 11.
FIG. 13 is a cross-section about line 13—13 of FIG. 12.
FIG. 14 is a view similar to FIG. 13, but with the lateral stabilizing flap member being retracted.
Figures 15, 22A:
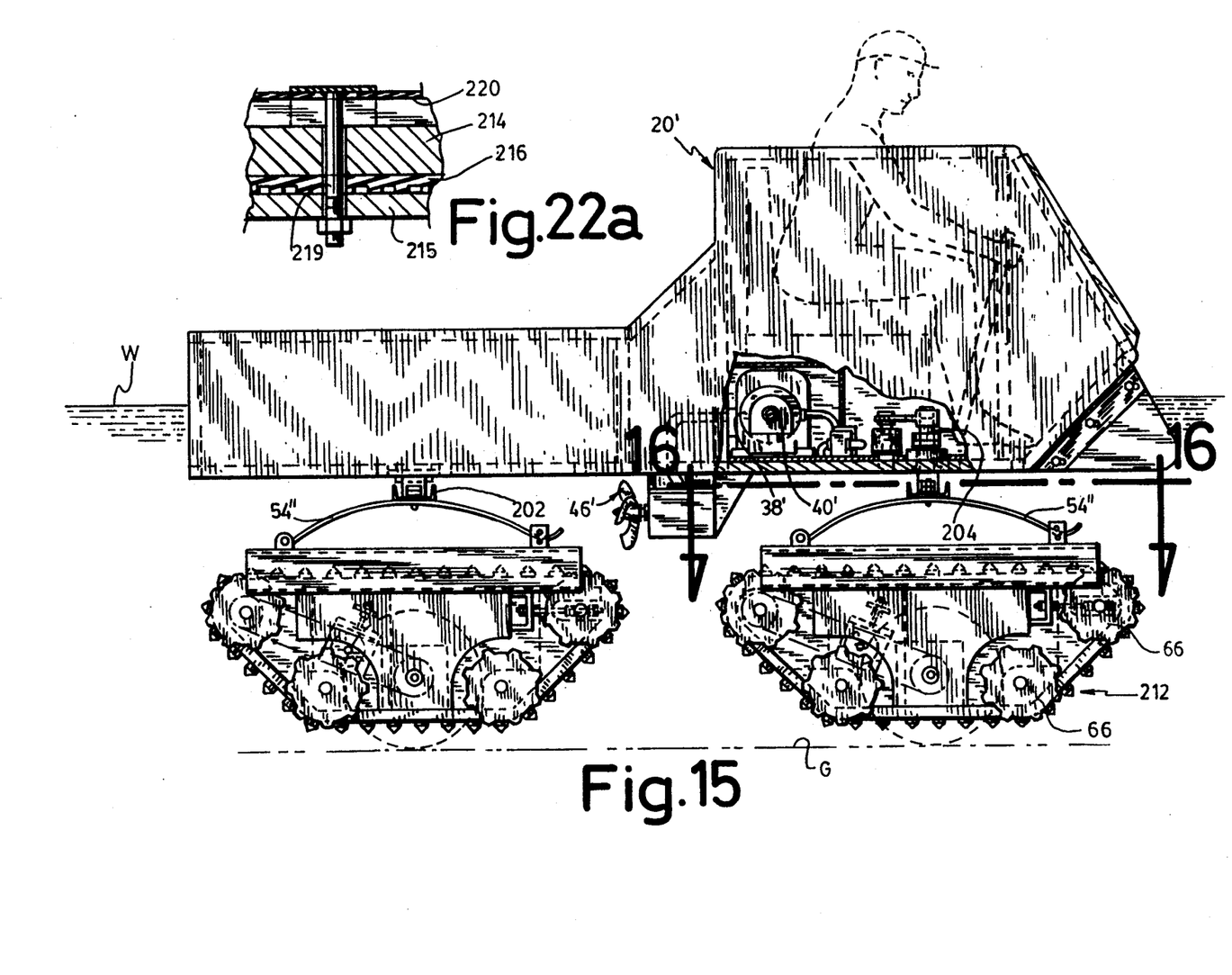
FIG. 15 is a side elevation of an alternate embodiment of the amphibious vehicle.
FIGS. 22—22a are enlarged cross-sections taken along line 22—22 of FIG. 21.

Hence, as sequentially suggested in FIGS. 13–14, each flap 128 is pivotable relative to main flap 124. Flap assembly 124–128 is extensible from a retracted, inoperative position (FIG. 14), in which edge flap 128 is folded back inwardly against the inner face of main flap wall 124 and in which main flap wall 124 extends generally at right angle to the flooring 26c of vehicle 20, to an extended operative position (FIG. 13), in which main flap 124 extends upwardly outwardly while edge flap 128 extends upwardly inwardly so that flaps 124 and 128 form a small obtuse angle. It is understood that, in its extended condition, flap member 124,128 forms an air pocket defining a top mouth 131, which increases the overall horizontal area of the vehicle engaging over water, without increasing the vehicle water displacement. It is also understood that flexible hinge strip 132 is bent into a U-shape, in the retracted condition of flap member 124–128 (FIG. 14).

A number of upright ears 134 are anchored to floor 26c, proximate side wall mouth 26b. Each ear 134 includes a top bore 134a and a bottom bore 134b, each bore alternately engageable by a lock pin 136. A number of elongated triangular link arms 138 are anchored at one outer end to main flap wall 124, in register with corresponding ears 134 and each defines a bore 138a at its inner corner end. Link arm bore 138a and all the ears bottom bores 134b come in axial register, in the retracted flap condition (FIG. 14), and link arm bore 138a and all ears top bores 134a come in axial register in the extended flap condition (FIG. 13); wherein link arms 138 can be locked by T-shape lock pins 136 (FIG. 12) in either operative or inoperative flap condition.

Figures 16, 17, 18, 19, 20, 21, 22:
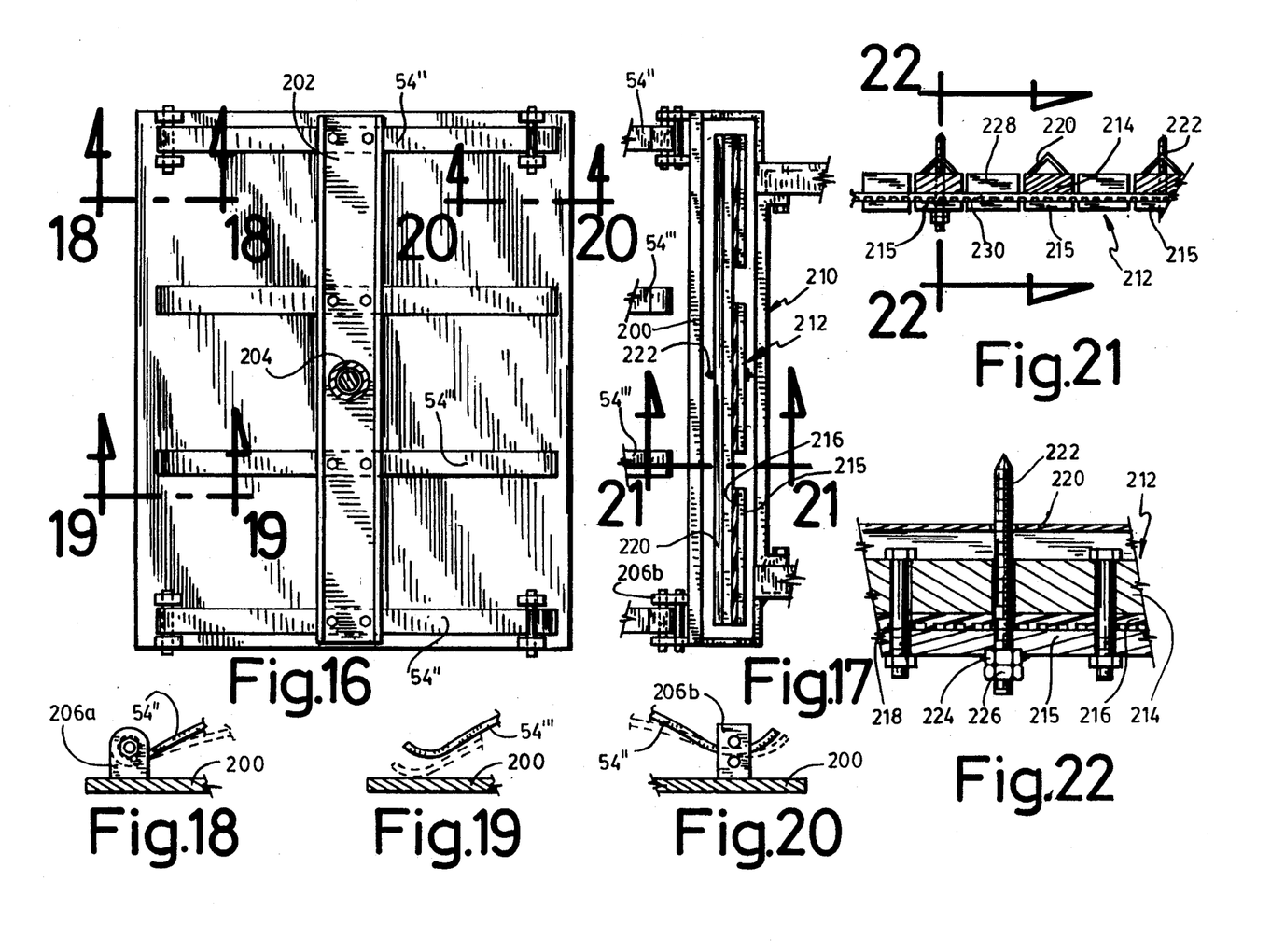
FIG. 16 is a top plan view taken along line 16—16 of FIG. 15.
FIG. 17 is a partial elevation of the assembly of FIG. 16, the track shown in cross-section.
FIGS. 18-20 are enlarged cross-sections taken along lines 18—18, 19—19 and 20—20 respectively of FIG. 16.
FIG. 21 is a longitudinal cross-section of the track about line 21—21 of FIG. 17.

In the alternate amphibious vehicle of FIGS. 15–23, the leaf spring suspension member 54" is connected to a large flat horizontal panel, 200, by a transverse strut 202 pivotally mounted thereto by vertical steering axle member 204. The outer ends of the exterior leaf springs 54" are pivotally anchored at one end member 206a (FIG. 17) to panel 200, and releasably pivoted at the other end member 206b to panel 200. Intermediate leaf spring members 54" are free from the panel at their outer ends, and are secured only at their intermediate portion to strut 202, as clearly illustrated in FIGS. 16, 17, 19. Leaf springs 54" operate under a heavier load. Panel 200 is the top part of a large hollow casing 210, through which engages the top run of the track 212, as illustrated in FIG. 21. The track 212 consists of a number of transverse full width, outer rigid boards, 214, serially interconnected by three endless elastomeric belts 216 which are sandwiched between boards 214, shorter inner boards 215 and retained thereto by anchoring bolts 218, 219. Full width angle cleats 220 are fixed to outer boards 214. Some of the rigid boards, 214, 215, are pierced with transversely extending, projecting spike bolts 222, see FIG. 23, to improve ground traction in inclined terrian. The axial position of bolts 222 can be adjusted by screwing in nut 224 and blocked by a lock nut 226. Abutment blocks 228 retained to belts 216 by retainer strips 230 are disposed between boards 214 to prevent inward flexing of track 212 while inner thinner strips 230 allow outward flexing of the track to turn around sprockets 66. Because the track 212 does not flex inwardly between sprockets 66 a much greater floatability is obtained on soft ground.

I claim:

1. An amphibious vehicle for automotive motion over public roads, dirt roads and water, said vehicle comprising:
    (a) a buoyant chassis, defining front and rear ends and underface;
    (b) a pair of first and second track members, rotatably mounted to the rear of said chassis underface;
    (c) a third track member, rotatably mounted to the front of said chassis underface;
    (d) hydraulic power means, one for each said track member, for entraining said track members for forward displacement of said vehicle;
        said third track member further defining a front, upwardly forwardly inclined side run for facilitating negotiation of sloped bank landing, egress from water and vehicle transfer to land; and
    (e) further including a fourth track member, slidingly carried to a rail member which is integrally mounted in a forwardly upwardly inclined fashion to the front end of said vehicle chassis whereby said fourth track member is forwardly upwardly located relative to said third track member spacedly therefrom, said fourth track member defining a straight, bottom, inclined run, the latter run being coextensive with and generally coplanar to said front side run of said third track member, wherein the position of said fourth track member along said rail member is accordingly adjustable as a function of the steepness of the slope bank terrain during bank-engaging operations of said amphibious vehicle.

2. An amphibious vehicle as defined in claim 1, wherein each of said first, second and third track members encloses buoyancy enhancing material.

3. An amphibious vehicle as defined in claim 1, further including releasable vehicle stabilizing means, integral to said vehicle chassis for providing dynamic, roll-preventing stabilization of said vehicle when partly submerged in water, during motion over water;
    wherein said stabilization means consists of a flap assembly, carried by each of the lateral sides defined by said vehicle chassis, each flap assembly including a panel member hinged at a bottom portion thereof to ears, said ears being anchored to a bottom floor defined by said vehicle chassis and integral to said vehicle chassis underface, wherein said flap panel member is extensible from a retracted, inoperative position, to an extended, upwardly outwardly inclined, operative position, whereby in said extended position, said flap panel member forms an upwardly opening air pocket which provides enhanced roll-control of the vehicle over water without increasing the vehicle water displacement.

4. An amphibious vehicle as defined in claim 1, further including a hydraulic ram, carried by said vehicle chassis front end and operatively connected to said fourth track member for power displacing said fourth track member slidingly along said forwardly upwardly inclined rail member.

5. An amphibious vehicle for automotive motion over public roads, dirt roads and water, said vehicle comprising:
  (a) a buoyant chassis, defining a front and a rear end and an underface;
  (b) a pair of first and second track members, rotatably mounted to the rear of said chassis underface;
  (c) a third track member, rotatably mounted to the front of said chassis underface;
  (d) hydraulic power means, one for each said track member, for entraining said track members for forward displacement of said vehicle; said third track member further defining a front, upwardly forwardly inclined side run for further facilitating negotiation of sloped bank landing, egress from water and vehicle transfer to land;
    wherein each of said track members includes a number of transverse, full width, outer rigid boards being serially interconnected by endless elastomeric belts, short inner boards applied against the interior side of said belts whereby said belts are taken in sandwich between said outer and inner boards, anchoring bolts fixedly anchoring said outer and inner boards through said belts, some of said outer boards being pierced with transversely extending, projecting spike bolts, said spike bolts for improving vehicle ground traction over inclined icy terrain, and adjustment lock nuts for screw adjusting the axial position of said spike bolts relative to said outer boards, whereby the outwardly projecting length of said spike bolts relative to said outer boards is adjustable to tractionally adapt to various terrain conditions.

6. An amphibious automotive vehicle as in claim 5, further including abutment blocks, retained to said belts by retainer strips and disposed between said outer boards, for preventing both accidental inward flexing of said track members and accidental load-borne lateral tilt of said spike bolts.

7. An amphibious automotive vehicle as defined in claim 5, wherein some of said outer boards integrally carry transversely extending, projecting angle cleats, said angle cleats for improving vehicle ground traction over snow.

8. An amphibious vehicle for automotive motion over public roads, dirt roads and water, said vehicle comprising:
  (a) a buoyant chassis, defining a front and a rear end and an underface;
  (b) a pair of first and second track members, rotatably mounted to the rear of said chassis underface;
  (c) a third track member, rotatably mounted to the front of said chassis underface;
  (d) hydraulic power means, one for each said track member, for entraining said track members for forward displacement of said vehicle; said third track member further defining a front, upwardly forwardly inclined side run for further facilitating negotiation of sloped bank landing, egress from water and vehicle transfer to land; wherein each of said track members includes a number of transverse, full width, outer rigid boards being serially interconnected by endless elastomeric belts, some of said outer boards being pierced with transversely extending, projecting spike bolts, said spike bolts for improving vehicle ground traction over inclined icy terrain, further including a fourth track member, slidingly carried to a rail member which is integrally mounted in a forwardly upwardly inclined fashion to the front end of said vehicle chassis whereby said fourth track member is forwardly upwardly located relative to said third track member spacedly therefrom, said fourth track member defining a straight, bottom, inclined run, the latter run being coextensive with and generally coplanar to said front side run of said third track member, wherein the position of said fourth track member along said rail member is accordingly adjustable as a function of the steepness of the slope bank terrain during bank-engaging operations of said amphibious vehicle.

* * * * *